Aug. 15, 1933.  R. MARTINI, JR  1,922,252
AUTOMATIC SAFETY CHECK DEVICE
Filed Oct. 10, 1930
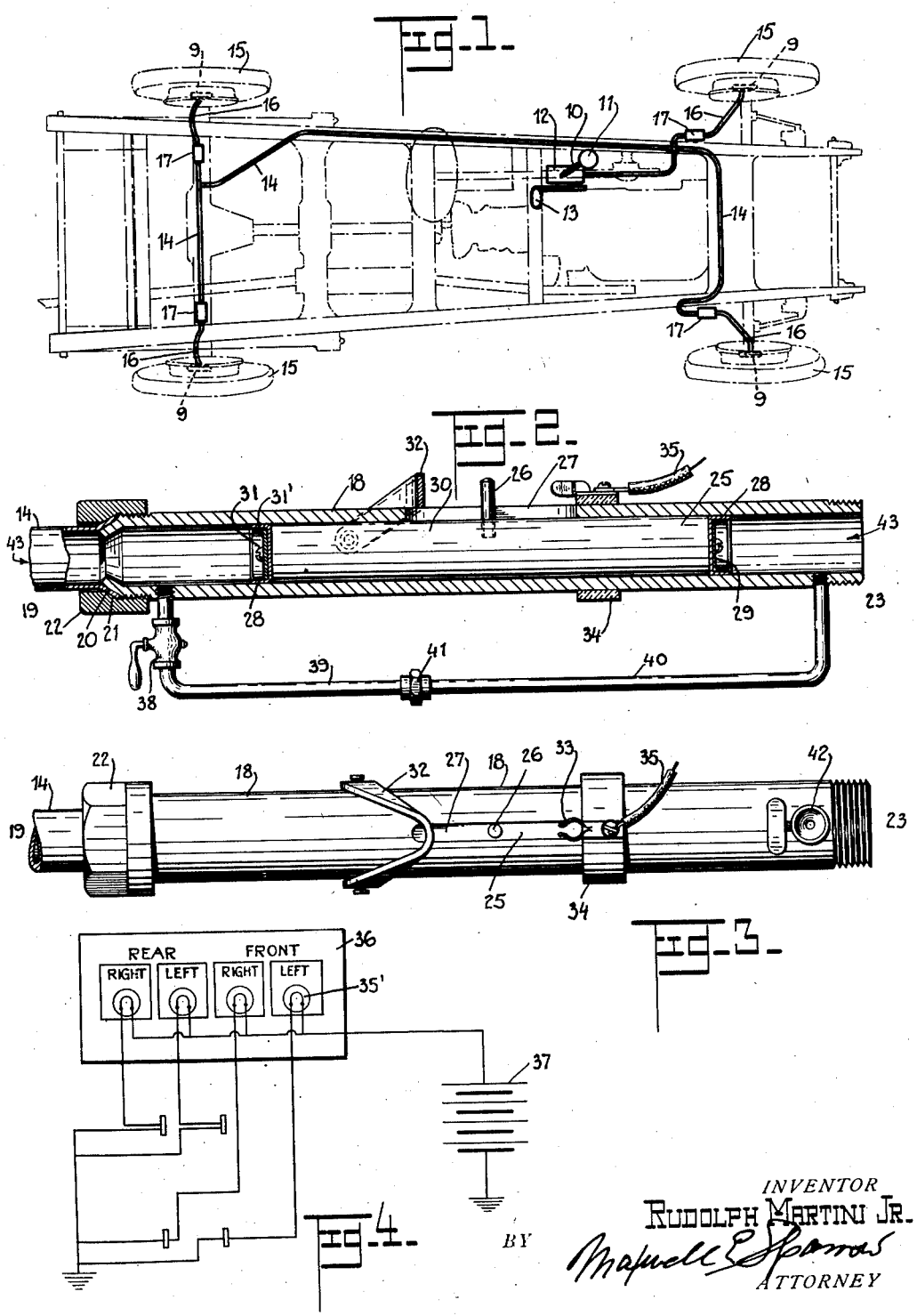
INVENTOR
RUDOLPH MARTINI JR.
BY
ATTORNEY Patented Aug. 15, 1933

1,922,252

UNITED STATES PATENT OFFICE 1,922,252

AUTOMATIC SAFETY CHECK DEVICE

Rudolph Martini, Jr., New York, N. Y.

Application October 10, 1930. Serial No. 487,704

5 Claims. (Cl. 303—84)

This invention relates to automatic safety check devices for hydraulic brake systems and has particular application to hydraulic automobile brakes.

An object of the invention is to provide an automatic safety check device adapted to be installed on hydraulic automobile brakes to automatically check the escape of liquid when the brake pedal is depressed in the event that a leak occurs between the safety device and the brake.

A further object of the invention is to provide a safety check device for hydraulic automobile brakes adapted to be installed in each of the pipe lines leading to the brakes to prevent the escape of the liquid in the event of a leak occurring in any one of the brake lines or cylinders thereby allowing the other brakes to perform their function.

A further object of the invention is to provide means whereby the existence of a leak and its location in any one of the brake lines equipped with the safety check device may be indicated on the instrument board.

In present hydraulic brake systems used on automobiles, when a leak occurs in any brake line, the entire system becomes inoperative for the liquid escapes from the main line through the point of leakage.

By the use of this invention, in the event, that one of the brake lines leaks, the brakes on the remaining wheels would still function.

These and other objects and advantages of the invention will appear from the following disclosure thereof together with the attached drawing, which illustrates certain embodiments thereof, and in which:—

Fig. 1 is a top view showing the outline of an automobile with the devices forming the invention installed in the hydraulic brake system.

Fig. 2 is a side view in section of the preferred form of the device.

Fig. 3 is a top view of the device in a modified form.

Fig. 4 is a schematic wiring diagram employed in the invention showing the electrical connections to the dash panel for indicating location of the leak with respect to the wheels.

In the drawing there is shown in Fig. 1, thereof, the outline of an automobile, the latter being equipped with a hydraulic brake system. The hydraulic brake system and the invention applied thereto is shown in full lines. The supply tank or reservoir 11, is connected by a tube 10 to the master cylinder 12 which houses the piston (not shown) operating therein. The brake pedal 13 is connected to the piston in cylinder 12. Leading from the master cylinder 12 to the cylinders at each of the four brakes 9 are metal tubes 14 and non-expanding hose or flexible tubings 16, each brake being associated with a wheel 15.

Interposed between the flexible tubing 16 which leads to the brake cylinders 8 and the tubes 14 are the automatic safety check devices 17 comprising the invention, one for each brake shoe. The device 17 comprises essentially of a cylinder 18 threaded at its ends, the end 19 of which is preferably tapered as shown at 20, to engage the flared end 21 of the tubing 14, these being joined together by means of a coupling 22. In this manner a tight joint is maintained.

The end 23 of cylinder 18 is coupled to the flexible tubing 16 by means of a suitable coupling. Disposed within the cylinder 18 is a piston 25 having a pin 26 which projects through a longitudinal slot 27 in the cylinder 18. The heads of the piston each preferably consist of leather cup 28, a metal disc or washer 29 positioned within cup 28, the said cup and washer being secured to the piston body 30 at its ends by means of a screw 31, the wall of the leather cup 28 being pressed against the inner wall of cylinder 18 by the action of a flat steel spring 31'. Pivotally attached to cylinder 18 is a retainer 32 which is adapted to extend over an end of the longitudinal slot 27 and to retain the pin 26 for a purpose hereinafter stated.

Disposed near the other end of the slot 27, is a metallic clamp 33 which is mounted on an insulated collar 34. Electrically connected to the clamp 33 is a conductor 35 which connects with one terminal of an electric lamp or other signalling element 35' preferably located on the instrument board 36.

The other terminal of the signalling element 35, is connected to one terminal of a storage battery 37 usually employed in the automobile. The piston 25 is grounded electrically. As shown in Fig. 4, mounted on the instrument board 36 is a signal element 35' for each wheel brake so that in the event of a leak occurring in any one of the brake lines the same will be indicated in a manner hereinafter stated.

In the preferred embodiment shown in Fig. 2, a by-pass is provided having its vents opening into the cylinder 18 on either side of the piston 25. A stop cock 38 is interposed in the by-pass.

For convenience, the by-pass may be formed into two sections, 39 and 40, each section being screw threaded to engage corresponding threads in the cylinder 18 and joined together by means a coupling 41.

Instead of the by-pass a fill-in cock 42 (see Fig. 3) may be provided in a position ahead of the piston 25 with relation to the brake cylinder 8.

The operation of the device is as follows:

Assuming that the device is in operation, in which case, the liquid 43 fills all the lines and cylinders, and in which case, the projection 26 is about midway of the ends of the longitudinal slot 27, then, in the event a leak occurs beyond the cylinder 18 of the safety device and the brake pedal 13 is depressed the piston 25 will be forced forwardly and the pin 26 will engage and electrically contact with the clamp 33, thereby closing the electrical circuit and the presence of the leak will be indicated through the instrumentality of the electric lamp on the instrument board. Since no liquid can go pass the piston 25, the leak will not prevent operation of the remaining brakes.

The leak can be repaired at any convenient time. In order to pump in the liquid in the space ahead of the piston 25, the stop cock 38, which is shown in closed position in the drawing, is opened and the pin or projection 26 is forced back and held in position by the retainer 32. The liquid is then pumped through the by-pass into the brake line ahead of the piston 25, and after the liquid is again distributed, the pin 26 is released, from the retainer 32, and the stop cock 38, closed.

Fig. 3 shows a modification of the device wherein there is substituted the fill-in cock 38 for the by-pass, so that the operation of the line ahead of the piston, may be filled manually.

It is to be understood that my invention may be applied in any hydraulic system line substantially filled with a liquid to be actuated upon by the application of pressure, the device being disposed intermediate the source and an objective for breaking the continuity of the liquid in the line and at the same time to maintain the continuity of the applied pressure from the source to the objective, and wherein the device is used to check the flow of liquid from the source in the event of a breach in the line between the device and the objective.

Although I have described my device with considerable detail and with respect to certain particular forms of my invention, I do not desire to be limited to such details since many changes and modifications may well be made without departing from the spirit and scope of my invention in its broadest aspect.

Having thus described my invention, what I claim as new and desire to secure by Letters Patent, is:—

1. In a fluid brake system, a fluid compressor, a plurality of fluid pressure brakes, a plurality of cylinders connected to said brakes and to said compressor, a piston in each cylinder having fluid in contact with each end, each cylinder having a longitudinal slot and a pin on each piston projecting through said slot and limiting movement of said piston in said cylinder.

2. In a fluid brake system, a fluid compressor, a plurality of fluid pressure brakes, a plurality of cylinders connected to said brakes and to said compressor, a piston in each cylinder having fluid in contact with each end, each cylinder having a longitudinal slot and a pin on each piston projecting through said slot and limiting movement of said piston in said cylinder, an electrical contact insulatingly supported by each cylinder adjacent one end of the slot therein, and a plurality of indicators electrically connected with said contacts.

3. In a fluid brake system, a fluid compressor, a plurality of fluid pressure brakes, a plurality of cylinders connected to said brakes and to said compressor, a piston in each cylinder having fluid in contact with each end, each cylinder having a longitudinal slot and a pin on each piston projecting through said slot and limiting movement of said piston in said cylinder, a valve controlled by-pass connecting the ends of said cylinder, and means at one end of said slot to engage said pin to hold the piston against movement.

4. In a fluid brake system, a fluid compressor, a plurality of fluid pressure brakes, a plurality of cylinders connected to said brakes and to said compressor, a piston in each cylinder having fluid in contact with each end, each cylinder having a longitudinal slot and a pin on each piston projecting through said slot and limiting movement of said piston in said cylinder, a valve controlled by-pass connecting the ends of said cylinder, an electrical contact insulatingly supported by each cylinder adjacent one end of said slot, and a plurality of indicators electrically connected with said contacts.

5. In a fluid brake system, a fluid compressor, a plurality of fluid pressure brakes, a plurality of cylinders connected to said brakes and to said compressor, a piston in each cylinder having fluid in contact with each end, each cylinder having a longitudinal slot and a pin on each piston projecting through said slot and limiting movement of said piston in said cylinder, a valve controlled by-pass connecting the ends of said cylinder, an electrical contact insulatingly supported by each cylinder adjacent one end of said slot, a plurality of indicators electrically connected with said contacts, and means at the opposite end of said slot to engage said pin to hold said piston against movement.

RUDOLPH MARTINI, Jr.